United States Patent Office 3,197,440
Patented July 27, 1965

3,197,440
1,4-DI(β-HYDROXYETHYLMERCAPTO)-2,3,5,6 TETRACHLOROBENZENE CONTAINING POLYETHER URETHANES
John J. Verbanc, Carrcroft, Wilmington, Del., assignor to E. I. du Pont de Nemours and Company, Wilmington, Del., a corporation of Delaware
No Drawing. Filed Mar. 23, 1961, Ser. No. 97,746
5 Claims. (Cl. 260—77.5)

This invention relates to a novel cured polyurethane polymer and more particularly to a polyurethane polymer prepared from an organic polyisocyanate, a polyether polyol, 1,4-di(β-hydroxyethylmercapto)-2,3,5,6-tetrachlorobenzene and, optionally, an aliphatic polyol.

It is an object of the present invention to provide a novel cured polyurethane polymer. A further object is to provide a cured polyurethane polymer which displays good tear resistance. A still further object is to provide a process for preparing such a polyurethane polymer. Other objects will appear hereinafter.

These and other objects of this invention are accomplished by providing a solid polyurethane polymer prepared from (1) an organic polyisocyanate, (2) a polyether polyol having a number average molecular weight between about 500 and 10,000, (3) 1,4-di(β-hydroxyethylmercapto)-2,3,5,6-tetrachlorobenzene and, optionally, (4) an aliphatic polyol having a number average molecular weight between about 62 and 350; the value of the molar ratio of —NCO groups to —OH groups ranging between about 0.95:1 and 1.1:1 with about 30 to 80 percent by weight of said polyurethane polymer being derived from said polyether polyol and about 5 to 35 percent by weight of said polyurethane polymer being derived from said 1,4-di(β-hydroxyethylmercapto)-2,3,5,6-tetrachlorobenzene. The essence of the present invention resides in the use of 1,4-di(β-hydroxyethylmercapto)-2,3,5,6-tetrachlorobenzene as a curing agent for a polyurethane polymer which is prepared from an organic polyisocyanate, a polyether polyol and, if desired, a relatively low molecular weight aliphatic polyol compound. The compound, 1,4-di(β-hydroxyethylmercapto)-2,3,5,6-tetrachlorobenzene, may be represented by the structural formula

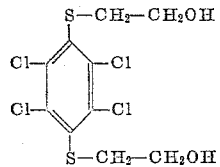

The novel polyurethane polymers of the present invention can be prepared by a number of procedures including either sequential or simultaneous mixing of the reactants described above in accordance with the above-defined proportions. Thus, these polyurethane polymers can be made by mixing together at one time the organic polyisocyanate, the polyether polyol, 1,4 - di(β - hydroxyethylmercapto)-2,3,5,6-tetrachlorobenzene and, optionally, the aliphatic polyol compound and reacting the mixture thereby obtained. In a representative alternative procedure the organic polyisocyanate may be reacted with the polyether polyol so as to form an isocyanate-terminated polyurethane polymer which is then finally reacted with 1,4-di(β-hydroxyethylmercapto)-2,3,5,6-tetrachlorobenzene and, if desired, the aliphatic polyol. Since the reactants can be added in any order, further alternatives will be readily apparent to those skilled in the art.

In preparing the polyurethane polymers of the present invention, any of a wide variety of polyisocyanates may be employed either alone or as isomer mixtures or as mixtures of different polyisocyanates. Aromatic, aliphatic and cycloaliphatic diisocyanates and combinations of these types are useful. Arylene diisocyanates, i.e. those in which each of the two isocyanato groups is attached directly to an aromatic ring, are preferred.

Representative polyisocyanate compounds include

Toluene-2,4-diisocyanate;
1,4-tetramethylenediisocyanate;
1,6-hexamethylenediisocyanate;
1,10-decamethylenediisocyanate;
1,5-naphthalenediisocyanate;
Cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatodiphenylether;
Benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluorenediisocyanate;
1,8-naphthalenediisocyanate;
1,3-phenylenediisocyanate;
Methylenebis(4-phenylisocyanate);
2,6-diisocyanatobenzfuran;
2,4,6-toluenetriisocyanate and
2,4,4'-triisocyanatodiphenylether.

Other representative organic isocyanates include: polyisocyanates (described in U.S. 2,683,730); organic diisocyanates (described in U.S. 2,292,443); organic triisocyanates (described in U.S. 2,929,794). Mixtures of any of the foregoing organic polyisocyanates can be employed when desired.

The polyether polyol reactants should have a number average molecular weight between about 500 and 10,000. The useful polyether polyols are polyalkyleneether glycols, polyalkylene-aryleneether glycols, polyalkyleneether-thioether glycols, polyalkylene-aryleneether-thioether glycols and polyalkyleneether triols. Polyalkyleneether glycols are preferred. Mixtures of the polyols may be used when desired.

The polyalkyleneether glycols may be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired. The use of polyalkyleneether glycols in the formation of polyurethane polymers is described in U.S. Patent 2,929,800.

Representative polyalkyleneether triols are made by reacting one or more alkylene oxides with one or more low molecular weight aliphatic triols. The alkylene oxides most commonly used have molecular weights between about 44 and 250. Examples include: ethylene oxide; propylene oxide; 1,2-epoxybutane; 1,2-epoxyhexane; 1,2 - epoxyoctane; 1,2 - epoxyhexadecane; 2,3- epoxybutane; 3,4-epoxyhexane; 1,2-epoxy-5-hexene; and 1,2-epoxy-3-butene. Ethylene and propylene oxide are preferred. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The aliphatic triols most commonly used have molecular weights between about 92 and 250. Examples include glycerol; 1,2,6-hexanetriol; 1,1,1-trimethylolpropane; 1,1,1-trimethylolethane; 2,4-dimethyl-2-methylolpentanediol-1,5; and the trimethylether of sorbitol. Representative examples of the polyalkyleneether triols include: polypropyleneether triol (M.W. 700) made by reacting 608 parts of 1,2-propylene oxide with 92 parts of glycerine; polypropyleneether triol (M.W. 1535) made by reacting 1401 parts of 1,2-propylene oxide with 134 parts of trimethylolpropane; polypropyleneether triol (M.W. 2500) made by reacting 2366 parts of 1,2-propylene oxide with 134 parts of 1,2,6-hexanetriol; and polypropyleneether triol (M.W. 6000) made by reacting 5866 parts of 1,2-propylene oxide with 134 parts of 1,2,6-hexanetriol. Further examples of these polyalkyleneether triols are given in U.S. Patent 2,866,774.

The polyalkylene-aryleneether glycols are similar to the polyalkyleneether glycols except that some arylene radicals are present. Representative arylene radicals include phenylene, naphthalene and anthracene radicals which may be substituted with various substituents, such as alkyl groups. In general, in these glycols there should be at least one alkyleneether radical having a molecular weight of about 500 for each arylene radical which is present. Polyurethane polymers prepared from these polyalkylene-aryleneether glycols are described in U.S. Patent 2,843,568.

The polyalkyleneether-thioether glycols and the polyalkylene-aryleneether glycols are similar to the above-described polyether glycols except that some of the ether-oxygen atoms are replaced by sulfur atoms. These glycols may be conveniently prepared by codensing together various glycols, such as thiodiglycol, in the presence of a catalyst, such as p-toluene-sulfonic acid. The use of these glycols in the formation of polyurethane polymers is described in U.S. Patent 2,900,368.

The aliphatic polyols which may optionally be employed in preparing the novel polyurethane polymers of this invention should have a number average molecular weight ranging from about 62 to 350. Representative glycols include ethylene glycol; propylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2-butene-1,4-diol; 3-cyclohexene-1,1-dimethanol; 4-methyl-3-cyclohexene-1,1-dimethanol and 3-methylene-1,5-pentanediol.

Further examples of aliphatic polyols include alkylene oxide modified diols such as diethylene glycol; (2-hydroxyethoxy)-1-propanol; 4-(2-hydroxyethoxy)-1-butanol; 5-(2-hydroxyethoxy)-1-pentanol; 3 - (2-hydroxypropoxy)1-propanol; 4-(2-hydroxypropoxy)-1 - butanol; 5-(2-hydroxypropoxy)-1-pentanol; 1-(2-hydroxyethoxy - 2-butanol; 1-(2-hydroxyethoxy)-2-pentanol; 1-(2-hydroxymethoxy)-2-hexanol; 1-(2-hydroxyethoxy)-2-octanol; 1-(2-hydroxypropoxy)-2-butanol; 1-(2-hydroxypropoxy) - 2-propanol; 1-(2-hydroxypropoxy)-2-hexanol and 1-(2-hydroxy propoxy)-2-octanol. Representative examples of ethylenically unsaturated low molecular weight diols include 3-allyloxy-1,5-pentanediol; 3-allyloxy-1,2-propanediol; 2-allyloxymethyl-2-methyl-1,3-propandiol; 2-methyl-2-[(4-pentenyloxy)methyl]-1,3-propanediol and 3-(o-propenylphenoxy-1,2-propanediol; others are listed in U.S. Patents 2,927,098 and 2,854,486. Representative examples of low molecular weight polyols having at least 3 hydroxyl groups include: glycerol; 1,2,6-hexanetriol; 1,1,1-trimethylolpropane; 1,1,1-trimethylolethane; pentaerythritol; 3-(2-hydroxyethoxy)-1,2-propanediol; 3-(2-hydroxypropoxy)-1-2,-propanediol; 6-(2 - hydroxyethoxy) - 1,2-hexanediol; 6-(2-hydroxypropoxy)-1,2-hexanediol and 2,4-dimethyl-2-(2-hydroxyethoxy)methyl-pentanediol-1,5; mannitol; galactitol; talitol; iditol; allitol; altritol; gulitol; arabitol; ribitol; xyitol; lyxitol; erythritol; theritol; 1,2,5,6-tetrahydroxyhexane; meso-inositol; surcrose; glucose; galactose; mannose; fructose; xylose; arabinose; dihydroxyacetone; glucose-α-methylglucoside; 1,1,1-tris[(2 - hydroxyethoxy)-methyl] ethane and 1,1,1,-tris[2-hydroxypropoxy)methyl]propane. Other examples are included in U.S. 2,917,468.

In preparing the novel polyurethane polymers of this invention, the proportions of reactants should be selected so that the value of the molar ratio of —NCO groups to the total number of —OH groups ranges between about 0.95:1 and 1.1:1. The polyurethanes exhibit less satisfactory tear strength properties when other proportions are employed.

In order that these polyurethane polymers have satisfactory elastomeric qualities, about 30 to 80 percent by weight of the ploymer should be derived from the polyether polyol. Values ranging between 40 to 70 percent by weight are preferred. The proper balance of desirable elasticity and high tear strength is imparted to the polyurethanes when the proportion of the 1,4-di(β-hydroxyethylmercapto)-2,3,5,6 - tetrachlorobenzene incorporated therein ranges between about 5 to 35 percent by weight. Values ranging between 9 and 27 percent by weight are preferred.

When preparing the polyurethane polymers of this invention, it is desirable to maintain homogeneity of the reactants from the time when they are mixed together until the time when they have completely reacted to form the final cured polyurethane. Those skilled in the art can readily select mixing times and reaction temperatures suitable for this purpose. In general, when the polyurethanes are prepared by simultaneous mixing of the above reactants, temperatures of from about 100° to 160° may be employed over a period of time of from about 5 minutes to 180 minutes. Temperatures of between 80° and 150° C. are convenient to use when the 1,4-di-(β-hydroxyethylmercapto)-2,3,5,6-tetrachlorobenzene is added to a fluid isocyanate-terminated polyurethane prepared by reacting the organic polyisocyanate with the polyether polyol and, if desired, the aliphatic polyol compound.

After the reactants have been mixed, it is generally desirable to deaerate the mixture at temperatures of from about 100 to 160° C. The fluid composition which is obtained by mixing the reactants eventually changes to a non-plastic, cured solid. The temperature must be high enough during this period to prevent phase separation in the reaction mass. Operating convenience will determine how much higher the temperature can be. The higher the temperature, the shorter will be the pot life of the fluid composition and the total reaction time. The incorporation of catalysts for urethane formation, such as triethylamine, metal carboxylates (e.g. lead naphthenate), diethylcyclohexylamine, or ferric acetyl acetonate decreases the pot life and total reaction time without affecting the quailty of the ultimate curved polyurethane. Those skilled in the art can readily determine the pot life and the reaction conditions for a particular composition by empirical means. Representative reaction times (often called cure times because a vulcanizate results) include: 20 hrs./105° C. (uncatalyzed), 4 hrs/105° C. (catalyzed), 10 min./121° C. (catalyzed). If desired, conventional pressures (e.g. 400–600 p.s.i.) may be applied during the molding of films and the like.

As noted above, the cured polyurethane polymers of this invention may be prepared by mixing the 1,4-di(β-hydroxyethylmercapto) - 2,3,5,6-tetrachlorobenzene with an already formed isocyanate-terminated polyurethane prepared by reacting the organic polyisocyanate with the polyether polyol and, optionally, the aliphatic polyol compound. If desired, the polyether polyol and the aliphatic polyol can be employed as a mixture although it is to be understood that some or all of them may be separately reacted and the products obtained blended to give the desired fluid isocyanate-terminated polyurethane composition. Agitation is normally used to provide thorough mixing of the reactants and to aid in the temperature control. The reaction is carried out at a temperature between about 25 and 150° C. for a period of from ½ to several hours. In general, it is preferred to carry out the reaction at 80° C. for a period of about 4 hours. It is to be understood that the lower temperatures require longer reaction times and at temperatures higher than about 100° C. an isocyanate-terminated composition of increased viscosity is obtained. If desired, the reaction may be carried out in more than one step. Thus, a hydroxyl-terminated polyurethane may be made by reacting the organic polyisocyanate with a molar excess of one or both of the polyols. This polyurethane in turn may then be reacted with additional organic polyisocyanate or isocyanate-terminated polyurethane.

The cured polyurethane polymers of this invention may be prepared by carrying out part or all of the reaction between the above-described reactants in an inert solvent. The cured polyurethane may be isolated from the solvent by conventional mechanical means such as spray drying, drum drying or evaporation. The solvent should be free from groups containing Zerewitinoff active hydrogen atoms

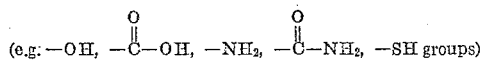

Representative examples of suitable solvents include lower dialkyl ketones (such as methyl isobutyl ketone), lower alkyl esters (such as ethyl acetate), aromatic hydrocarbons (such as toluene and xylene), aliphatic hydrocarbons (such as hexane), chlorinated hydrocarbons (such as trichloro or tetrachloroethylene), cyclic ethers (such as tetrahydrofuran). Those skilled in the art can readily select the solids content which will depend on operating convenience.

The cured polyurethane polymers of this invention have many varied applications. They are particularly useful for machine parts, potting and encapsulation of electronic equipment, and as a metal replacement. Among the many articles and uses to which these cured products are applicable may be mentioned the following: solid tires; mechanical goods, molded, lathe cut, stamped out, cast or dipped, such as grommets, sealing rings, channel rubbers, packing gaskets, mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers or shock absorbers.

The following examples will better illustrate the nature of the present invention; however, the invention is not intended to be limited to these examples. Parts are by weight unless otherwise indicated.

Vulcanizate properties were measured at the temperatures indicated in accordance with the following procedures:

| | ASTM method |
|---|---|
| Shore A hardness (25° C.) | D676-58T. |
| Compression set (22 hrs., 70° C.) | D395-55, Method B. |
| Yerzley resilience (25° C.) | D945-55. |
| Rebound resilience (25° C.) | D-1054. |
| Tear resistance (25° C.) | D-624. |

The modulus at 300% extension ($M_{300}$) or 200% extension ($M_{200}$), tensile strength at the break ($T_B$), and the percent extension at the break ($E_B$) were measured on Scott dumbells (ASTMD 412-51T) with an Instron testing machine set at a crosshead speed of 10 inches/min. and a load of 100 pounds.

*Preparation of polymer A*

Toluene-2,4-diisocyanate (278.7 grams, 1.6 moles) and anhydrous polytetramethyleneether glycol (number average molecular weight 1000) (1000 grams, 1.0 mole) were agitated at 80° C. for 4 hours in a dry reaction vessel protected from atmospheric moisture. Polymer A thus obtained had a free NCO-group content of 4.2%, a Brookfield viscosity at 30° C. of about 16,500 cps., and a number average molecular weight of about 2000.

*Preparation of polymer B*

A mixture consisting of toluene-2,4-dissocyanate (348.4 grams, 2.0 moles), 1,3-butanediol (45 grams, 0.5 mole), and anhydrous polytetramethyleneether glycol (number average molecular weight 1000) (500 grams, 0.5 mole) was agitated at 80° C. for 4 hours under a protective nitrogen atmosphere in a dry reaction vessel. Polymer B thereby obtained had a free NCO-group content of 9.4% and a Brookfield viscosity at 30° C. of 8100 cps.

*Preparation of polymer C*

Toluene-2,4-diisocyanate (38.3 grams, 0.22 mole) and polytetramethyleneether glycol (number average molecular weight of 2690) (265 grams, 0.0986 mole) were stirred together at 25° C. for one hour in a dry reaction vessel protected from atmospheric moisture. External heat was applied and the mixture was agitated at 80° C. for 3 hours. Polymer C thus obtained had a free NCO-group content of 3.34% by weight.

*Preparation of polymer D*

Toluene-2,4-diisocyanate (90.5 grams, 0.52 mole) and polytetramethyleneether glycol (number average molecular weight 2040) (510 grams, 0.25 mole) were agitated at 80° C. for 4 hours in an anhydrous reaction vessel protected from atmospheric moisture. Polymer D thus obtained had a free NCO-group content of 3.65% by weight.

*Preparation of polymer E*

Toluene-2,4-diisocyanate (348.4 grams, 2.0 moles) and anhydrous polytetramethyleneether glycol having a number average molecular weight of 1000 (1000 grams, 1.0 mole) were agitated at 80° C. for 4 hours in a dry reaction vessel protected from atmospheric moisture. Polymer E thus obtained had a free NCO content of 6.4% and a Brookfield viscosity at 30° C. of 6000 to 7000 cps.

EXAMPLE 1

(A) To polymer A (50 grams) at 25° C. was added 1,4-di(β-hydroxyethylmercapto) - 2,3,5,6-tetrachlorobenzene (8.71 grams). The clear solution obtained by stirring and deaerating this mixture at 110–150° C. was poured into an open hot mold and cured for 20 hours at 105° C. The polytetramethyleneether glycol units comprised about 66.5% by weight and the 1,4-di(β-hydroxyethylmercapto)-2,3,5,6 - tetrachlorobenzene units about 14.8% by weight of the vulcanizate. The NCO:OH molar ratio was 0.99:1. The vulcanizate displayed the following properties.

| | |
|---|---|
| $M_{300}$ | 1390 lb./sq. in. |
| $E_B$ | 790%. |
| $T_B$ | 3300 lb./sq. in. |
| Shore A hardness | 92. |
| Rebound resilience | 58%. |
| Compression set | 58%. |
| Tear strength | 250 lb./in. |

(B) The same properties were obtained when .14% by weight of any one of the following additives was also present in the mixture being cured in Part A above: lead naphthenate, diethylcyclohexylamine and triethylamine.

EXAMPLE 2

(A) To polymer A (50 grams) was added 1,4-di(β-hydroxyethylmercapto) - 2,3,5,6 - tetrachlorobenzene (8.25 grams) and 1,2,6-hexanetriol (0.212 gram). The mixture was stirred and deaerated at 110–150° C. until a clear solution was obtained, then poured into an open hot mold and cured for 20 hours as 105° C. The polytetramethyleneether glycol units comprised about 67% by weight and the 1,4-di(β-hydroxyethylmercapto) - 2,3,5,6-tetrachlorobenzene units about 14.1% by weight of the vulcanizate. The NCO:OH molar ratio was 0.975:1. The vulcanizate displayed the following properties:

| | |
|---|---|
| $M_{300}$ | 1380 lb./sq. in. |
| $E_B$ | 630%. |
| $T_B$ | 4300 lb./sq. in. |
| Shore A hardness | 91. |
| Compression set | 50%. |
| Rebound resilience | 58%. |
| Tear strength | 100 lb./in. |

(B) The same results were obtained when 0.05% by weight of lead naphthenate was also present in the mixture being cured in Part A above.

(C) The procedure of Part A above was repeated except that trimethylolpropane was substituted for 1,2,6-hexanetriol. The vulcanizate obtained displayed the following properties:

| | |
|---|---|
| $M_{300}$ | 1335 lb./sq. in. |
| $E_B$ | 590%. |
| $T_B$ | 3350 lb./sq. in. |
| Shore A hardness | 90. |
| Compression set | 38%. |
| Rebound resilience | 57%. |
| Tear strength | 100 lb./in. |

(D) To polymer C (100 grams) were added 1,4-di-(β-hydroxyethylmercapto)-2,3,5,6-tetrachlorobenzene (13.1 grams) and 1,2,6-hexanetriol (0.356 gram). The clear solution obtained by heating this mixture at 125° was thereafter poured into an open hot mold and cured for 20 hours at 105° C. The polytetramethyleneether glycol units comprised about 78.1% by weight and the 1,4-di(β-hydroxyethylmercapto) - 2,3,5,6-tetrachlorobenzene units about 11.6% by weight of the vulcanizate. The NCO:OH molar ratio was 1.02:1. The vulcanizate displayed the following properties:

| | |
|---|---|
| $M_{300}$ | 750 lb./sq. in. |
| $E_B$ | 790%. |
| $T_B$ | 4000 lb./sq. in. |
| Shore A hardness | 80. |
| Compression set | 46%. |
| Yerzley resilience | 75%. |
| Rebound resilience | 62%. |
| Tear strength | 170 lb./in. |

(E) The general procedure of Part A above was repeated using polymer A (50 grams), 1,4-di(β-hydroxyethylmercapto)-2,3,5,6-tetrachlorobenzene (7.83 grams), and neopentyl glycol (0.226 gram). The polytetramethyleneether units comprised about 77.6% by weight and the 1,4-di(β-hydroxyethylmercapto) - 2,3,5,6-tetrachlorobenzene units about 11.25% by weight of the vulcanizate. The NCO:OH molar ratio was 0.98:1.

The vulcanizate was a tough elastomer exhibiting the following properties:

| | |
|---|---|
| $M_{300}$ | 1370 lb./sq. in. |
| $E_B$ | 670%. |
| $T_B$ | 3650 lb./sq. in. |
| Shore A hardness | 91. |
| Compression set | 38%. |
| Rebound resilience | 57%. |
| Tear strength | 120 lb./in. |

EXAMPLE 3

(A) Polymer D (50 grams) and 1,4-di(β-hydroxyethylmercapto)-2,3,5,6-tetrachlorobenzene (7.95 grams) were mixed, heated at 125° C. until a clear solution was produced, poured into an open hot mold and cured for 20 hours at 105° C. The polytetramethyleneether glycol units comprised about 73.4% by weight and the 1,4-di(β-hydroxyethylmercapto) - 2,3,5,6-tetrachlorobenzene units about 13.7% by weight of the vulcanizate. The NCO:OH molar ratio was 1.02:1. The vulcanizate thus made exhibited the following properties:

| | |
|---|---|
| $M_{300}$ | 1000 lb./sq. in. |
| $E_B$ | 720%. |
| $T_B$ | 3800 lb./sq. in. |
| Shore A hardness | 86. |
| Compression set | 53%. |
| Rebound resilience | 65%. |
| Yerzley resilience | 78%. |
| Tear strength | 200 lb./in. |

(B) Polymer C (50 grams) and 1,4-di(β-hydroxyethylmercaupto)-2,3,5,6-tetrachlorobenzene (7.27 grams) were mixed, heated at 125° C. until a clear solution was produced, poured into a hot mold and cured for 20 hours at 105° C. The polytetramethyleneether glycol units comprised about 76.2% by weight and the 1,4-di(β-hydroxyethylmercapto)-2,3,5,6-tetrachlorobenzene about 12.7% by weight of the vulcanizate. The NCO:OH molar ratio was 1:1. The vulcanizate exhibited the following properties:

| | |
|---|---|
| $M_{300}$ | 800 lb./sq. in. |
| $E_B$ | 870%. |
| $T_B$ | 2000 lb./sq. in. |
| Shore A hardness | 82. |
| Compression set | 63%. |
| Yerzley resilience | 72%. |
| Rebound resilience | 63%. |
| Tear strength | 180 lb./in. |

EXAMPLE 4

This example demonstrates that polymer A cured with 1,4 - di(β-hydroxyethylmercapto)-2,3,5,6-tetrachlorobenzene can be compounded with carbon black on a rubber mill to give a highly tear resistant elastomer. High abrasion furnace black (12.5 grams) and N-phenyl-β-naphthylamine (0.25 gram) were incorporated on a rubber roll mill into 25 grams of the cured elastomer prepared by the procedure of Example 1.

The compounded elastomer was molded at 500–600 lb./sq. in. at 121° for 10 minutes. The slab obtained displayed the following properties:

| | |
|---|---|
| $M_{200}$ | 2330 lb./sq. in. |
| $E_B$ | 220%. |
| $T_B$ | 2300 lb./sq. in. |
| Shore A hardness | 93. |
| Rebound resilience | 35%. |
| Compression set | 73%. |
| Tear strength | 380 lb./in. |

EXAMPLE 5

(A) To polymer A (100 grams) was added pulverized 1,4 - di(β-hydroxyethylmercapto)-2,3,5,6-tetrachlorobenzene (18.5 grams); the mixture obtained was thoroughly stirred until homogeneous to the eye. It was then allowed to stand for five days at room temperature. Then 25 grams of the mixture were heated and deaerated at 125° C. As soon as a clear solution had been obtained, it was poured into an open hot mold and cured at 105° C. for 24 hours. The polytetramethyleneether glycol units comprised about 66% by weight and the 1,4-di(β-hydroxyethylmercapto) - 2,3,5,6 - tetrachlorobenzene units about 15.6% by weight of the vulcanizate. The NCO:OH molar ratio was 0.97:1. The vulcanizate displayed the following properties:

$M_{300}$ —————————————————— 1390 lb./sq. in.
$E_B$ ————————————————————— 690%.
$T_B$ ————————————————————— 3000 lb./sq. in.
Shore A hardness ——————————— 91.
Compression set ———————————— 55%.
Rebound resilience ———————————— 55%.
Tear strength ——————————————— 250 lb./in.

(B) The procedure of Part A was repeated except that the mixture of polymer A and 1,4-di(β-hydroxyethylmercapto)-2,3,5,6-tetrachlorobenzene was allowed to stand for 10 days at room temperature prior to heating. The vulcanizate prepared displayed the following properties:

$M_{300}$ —————————————————— 2350 lb./sq. in.
$E_B$ ————————————————————— 300%.
$T_B$ ————————————————————— 2350 lb./sq. in.
Shore A hardness ——————————— 99.
Compression set ———————————— 58%.
Rebound resilience ———————————— 49%.
Tear strength ——————————————— 450 lb./in.

EXAMPLE 6

Polymer A (50 grams) and 1,4-di(β-hydroxyethylmercapto)-2,3,5,6-tetrachlorobenzene (9.2 grams) were stirred together and heated at 125° C. for 60 minutes. The mixture was then poured into an open mold and heated at 96° C. for 24 hours. The polytetramethyleneether glycol units comprised about 66% by weight and the 1,4-di(β - hydroxyethylmercapto)-2,3,5,6-tetrachlorobenzene units about 15.5% by weight of the vulcanizate. The NCO:OH molar ratio was 0.97:1. The cured elastomer thus made displayed the following properties:

$M_{300}$ —————————————————— 1220 lb./sq. in.
$E_B$ ————————————————————— 570%.
$T_B$ ————————————————————— 3200 lb./sq. in.
Shore A hardness ——————————— 89.
Yerzley resilience ——————————— 74%.
Compression set ———————————— 42%.
Tear strength ——————————————— 100 lb./in.
Rebound resilience ———————————— 54%.

EXAMPLE 7

To polymer B (50 grams) was added 1,4-di(β-hydroxyethylmercapto)-2,3,5,6-tetrachlorobenzene (20.56 grams). The mixture was heated at 125° C. until clear, then poured into a hot open mold and kept at 105° C. for 24 hours. The polytetramethyleneether glycol units comprised about 30% by weight and the 1,4-di(β-hydroxyethylmercapto)-2,3,5,6-tetrachlorobenzene units about 29.1% by weight of the vulcanizate. The NCO:OH molar ratio was 1:1. The cured slab obtained displayed the following properties:

$M_{200}$ —————————————————— 2750 lb./sq. in.
$E_B$ ————————————————————— 200%.
$T_B$ ————————————————————— 2750 lb./sq. in.
Shore D hardness ——————————— 60.
Compression set ———————————— 65%.
Tear strength ——————————————— 450 lb./in.

EXAMPLE 8

The general procedure of Example 7 was repeated using 35 grams of polymer E and 9.72 grams of 1,4-di(β-hydroxyethylmercapto)-2,3,5,6 - tetrachlorobenzene. The polytetramethyleneether glycol units comprised about 59% by weight and the 1,4-di(β-hydroxyethylmercapto)-2,3,5,6-tetrachlorobenzene units about 29.1% by weight of the vulcanizate. The NCO:OH molar ratio was 0.99:1. The vulcanizate obtained by a cure at 100° C. for 22 hours displayed the following properties:

$M_{300}$ —————————————————— 1700 lb./sq. in.
$E_B$ ————————————————————— 600%.
$T_B$ ————————————————————— 3600 lb./sq. in.
Shore A hardness ——————————— 95.
Compression set ———————————— 51%.
Tear strength ——————————————— 215 lb./in.

EXAMPLE 9

(A) After polytetramethyleneether glycol (M.W. 1000) (30 grams) and toluene-2,4-diisocyanate (7.1 grams) had been heated for 5 minutes to 125° C., 1,4-di(β - hydroxyethylmercapto)-2,3,5,6-tetrachlorobenzene (3.6 grams) was added. The mixture obtained was heated and deaerated at 125° C. until a clear solution resulted. This solution was then poured into an open hot mold, and cured at 100° C. for 20 hours. The polytetramethyleneether glycol unit comprised about 64% by weight and the 1,4-di(β-hydroxyethylmercapto)-2,3,5,6-tetrachlorobenzene units about 8.95% by weight of the vulcanizate. The NCO:OH molar ratio was 1.02:1. The vulcanizate obtained displayed the following properties:

$M_{300}$ —————————————————— 820 lb./sq. in.
$E_B$ ————————————————————— 720%.
$T_B$ ————————————————————— 3450 lb./sq. in.
Shore A hardness ——————————— 78.
Compression Set ———————————— 47%.
Yerzley resilience ——————————— 80%.
Tear strength ——————————————— 100 lb./in.

(B) A procedure similar to that of Part A was used employing polytetramethyleneether glycol (M.W. 1000) (80 grams), toluene-2,4-diisocyanate (17.8 grams) and 1,4-di (β - hydroxyethylmercapto) - 2,3,5,6-tetrachlorobenzene (7.2 grams). The polytetramethyleneether glycol units comprised about 76.2% by weight and the 1,4-di(β-hydroxyethylmercapto) - 2,3,5,6 - tetrachlorobenzene units about 6.86% by weight of the vulcanizate. The NCO:OH molar ratio was 1.02:1. The elastomer which resulted displayed the following properties:

$M_{300}$ —————————————————— 570 lb./sq. in.
$E_B$ ————————————————————— 720%.
$T_B$ ————————————————————— 3100 lb./sq. in.
Shore A hardness ——————————— 73.
Compression Set ———————————— 43%.
Yerzley resilience ——————————— 80%.
Tear strength ——————————————— 67 lb./in.

As many widely different embodiments of this invention may be made without departing from the spirit and scope thereof, it is to be understood that this invention is not limited to the specific embodiments thereof except as defined in the appended claims.

What is claimed is:

1. A cured polyurethane polymer obtained by reacting an isocyanate-terminated polyurethane polymer with 1,4-di(β - hydroxyethylmercapto)-2,3,5,6-tetrachlorobenzene, said isocyanate-terminated polyurethane polymer being prepared by reacting an organic polyisocyanate with a polyether polyol having a number average molecular weight between about 500 and 10,000; the value of the molar ratio of —NCO groups to —OH groups ranging between about 0.95:1 and 1.1:1 with about 30 to 80 percent by weight of said cured polyurethane polymer being derived from said polyether polyol and about 5 to 35 percent by weight of said polyurethane polymer being derived from said 1,4-di(β-hydroxyethylmercapto)-2,3,5,6-tetrachlorobenzene.

2. A cured polyurethane polymer obtained by reacting an isocyanate-terminated polyurethane polymer with 1,4-di(β - hydroxyethylmercapto)-2,3,5,6-tetrachlorobenzene, said isocyanate-terminated polyurethane polymer being prepared by reacting an organic polyisocyanate with a polyether glycol having a number average molecular weight between about 500 and 10,000; the value of the molar ratio of —NCO groups to —OH groups ranging between about 0.95:1 and 1.1:1 with about 30 to 80 percent by weight of said cured polyurethane polymer being derived from said polyether glycol and about 5 to 35 percent by weight of said polyurethane polymer being derived from said 1,4-di($\beta$-hydroxyethylmercapto)-2,3,5,6-tetrachlorobenzene.

3. A cured polyurethane polymer according to claim 2 wherein the polyether glycol is selected from the group consisting of polyalkyleneether glycols, polyalkylene-aryleneether glycols, polyalkyleneether-thioether glycols and polyalkylene-aryleneether-thioether glycols.

4. A cured polyurethane polymer according to claim 2 wherein the 1,4 - di($\beta$ - hydroxyethylmercapto)-2,3,5,6-tetrachlorobenzene is reacted with the isocyanate-terminated polyurethane polymer at a temperature of from about 80 to 150° C.

5. A cured polyurethane polymer according to claim 2 wherein from 40 to 70 percent by weight of said polymer is derived from said polyether glycol and from 9 to 27 percent by weight of said polymer is derived from said 1,4 - di($\beta$-hydroxyethylmercapto)-2,3,5,6-tetrachlorobenzene.

References Cited by the Examiner
UNITED STATES PATENTS

| 2,989,512 | 6/61 | Nischk | 260—77.5 |
| 3,005,803 | 10/61 | Holtschmidt | 260—77.5 |
| 3,032,535 | 5/62 | Holtschmidt | 260—77.5 |

LEON J. BERCOVITZ, *Primary Examiner.*

HAROLD N. BURSTEIN, DONALD E. CZAJA,
*Examiners.*